US012650585B2

(12) United States Patent
Koguchi et al.

(10) Patent No.: US 12,650,585 B2
(45) Date of Patent: Jun. 9, 2026

(54) SCANNING PROBE MICROSCOPE

(71) Applicant: Hitachi, Ltd., Tokyo (JP)

(72) Inventors: Masanari Koguchi, Tokyo (JP); Teruo Kohashi, Tokyo (JP); Tomihiro Hashizume, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 311 days.

(21) Appl. No.: 18/380,309

(22) Filed: Oct. 16, 2023

(65) Prior Publication Data

US 2024/0126061 A1 Apr. 18, 2024

(30) Foreign Application Priority Data

Oct. 18, 2022 (JP) .................................. 2022-166817

(51) Int. Cl.
| | |
|---|---|
| *G02B 21/04* | (2006.01) |
| *G01Q 30/02* | (2010.01) |
| *G01Q 70/14* | (2010.01) |
| *G02B 21/00* | (2006.01) |

(52) U.S. Cl.
CPC ........... *G02B 21/04* (2013.01); *G01Q 30/025* (2013.01); *G01Q 70/14* (2013.01); *G02B 21/0076* (2013.01)

(58) Field of Classification Search
CPC .... G02B 21/04; G02B 21/0076; G02B 21/00; G02B 21/0004; G02B 21/002; G02B 21/0024; G02B 21/0032; G02B 21/0036; G02B 21/0052; G02B 21/006; G02B 21/06; G02B 21/36; G02B 21/361; G01Q 30/025; G01Q 70/14; G01Q 30/02; G01Q 70/00; G01Q 70/08
USPC ....... 359/364, 362, 363, 368, 369, 381, 385, 359/388, 390; 850/5, 6, 9, 52, 59
See application file for complete search history.

(56) References Cited

U.S. PATENT DOCUMENTS

| | | | | |
|---|---|---|---|---|
| 9,482,612 | B2 * | 11/2016 | Heidmann | ......... G01N 21/6489 |
| 10,041,971 | B2 | 8/2018 | Grinolds et al. | |
| 2015/0253355 | A1 | 9/2015 | Grinolds et al. | |
| 2017/0059609 | A1 * | 3/2017 | Watanabe | .............. G01Q 20/02 |
| 2018/0246143 | A1 | 8/2018 | Grinolds et al. | |
| 2022/0413007 | A1 | 12/2022 | Grinolds et al. | |

FOREIGN PATENT DOCUMENTS

| | | | | |
|---|---|---|---|---|
| JP | H09189707 A | * | 7/1997 | ............. G01Q 20/02 |
| JP | 2015-529328 A | | 10/2015 | |

* cited by examiner

*Primary Examiner* — Arnel C Lavarias
(74) *Attorney, Agent, or Firm* — Miles & Stockbridge, P.C.

(57) ABSTRACT

A scanning probe microscope for determining a measurement location when a numerical aperture of an objective lens is relatively large. The scanning probe microscope includes a probe which scans a sample; a light source which irradiates the probe with excitation light via an objective lens; a detector which detects fluorescence generated at the probe; a reflective member arranged between the objective lens and the sample; and an imaging device which images a reflecting surface of the reflective member.

8 Claims, 8 Drawing Sheets

SCANNING PROBE MICROSCOPE

CLAIM OF PRIORITY

The present application claims priority from Japanese Patent Application JP 2022-166817 filed on Oct. 18, 2022, the content of which is hereby incorporated by reference into this application.

BACKGROUND OF THE INVENTION

The present invention relates to a scanning probe microscope.

A scanning probe microscope is a device which images the shape and physical property values of a sample by scanning the sample with a fine needle-shaped probe.

There has been disclosed in Japanese Unexamined Patent Application Publication (Translation of PCT application) No. 2015-529328, a scanning probe microscope which uses a diamond (hereinafter referred to as an NV diamond) having nitrogen-vacancy pairs as a probe, irradiates the probe with excitation light and microwaves, and collects fluorescence emitted from the nitrogen-vacancy pairs.

SUMMARY OF THE INVENTION

However, in Japanese Unexamined Patent Application Publication (Translation of PCT application) No. 2015-529328, no consideration is given to easily determining a measurement location from a sample. Since many scanning probe microscopes use an objective lens having a relatively large numerical aperture, the field of view obtained via the objective lens is narrow, and it takes time and effort to determine the measurement location.

Therefore, it is an object of the present invention to provide a scanning probe microscope capable of easily determining a measurement location even when the numerical aperture of an objective lens is relatively large.

In order to achieve the above object, the scanning probe microscope comprises: a probe which scans a sample; a light source which irradiates the probe with excitation light via an objective lens; and a detector which detects fluorescence generated at the probe, and the scanning probe microscope further includes: a reflective member arranged between the objective lens and the sample; and a reflecting surface imaging device which images a reflecting surface of the reflective member.

According to the present invention, the scanning probe microscope capable of easily determining a measurement location can be provided even when the numerical aperture of the objective lens is relatively large.

DETAILED DESCRIPTION OF THE PREFERRED EMBODIMENTS

Figure 1:
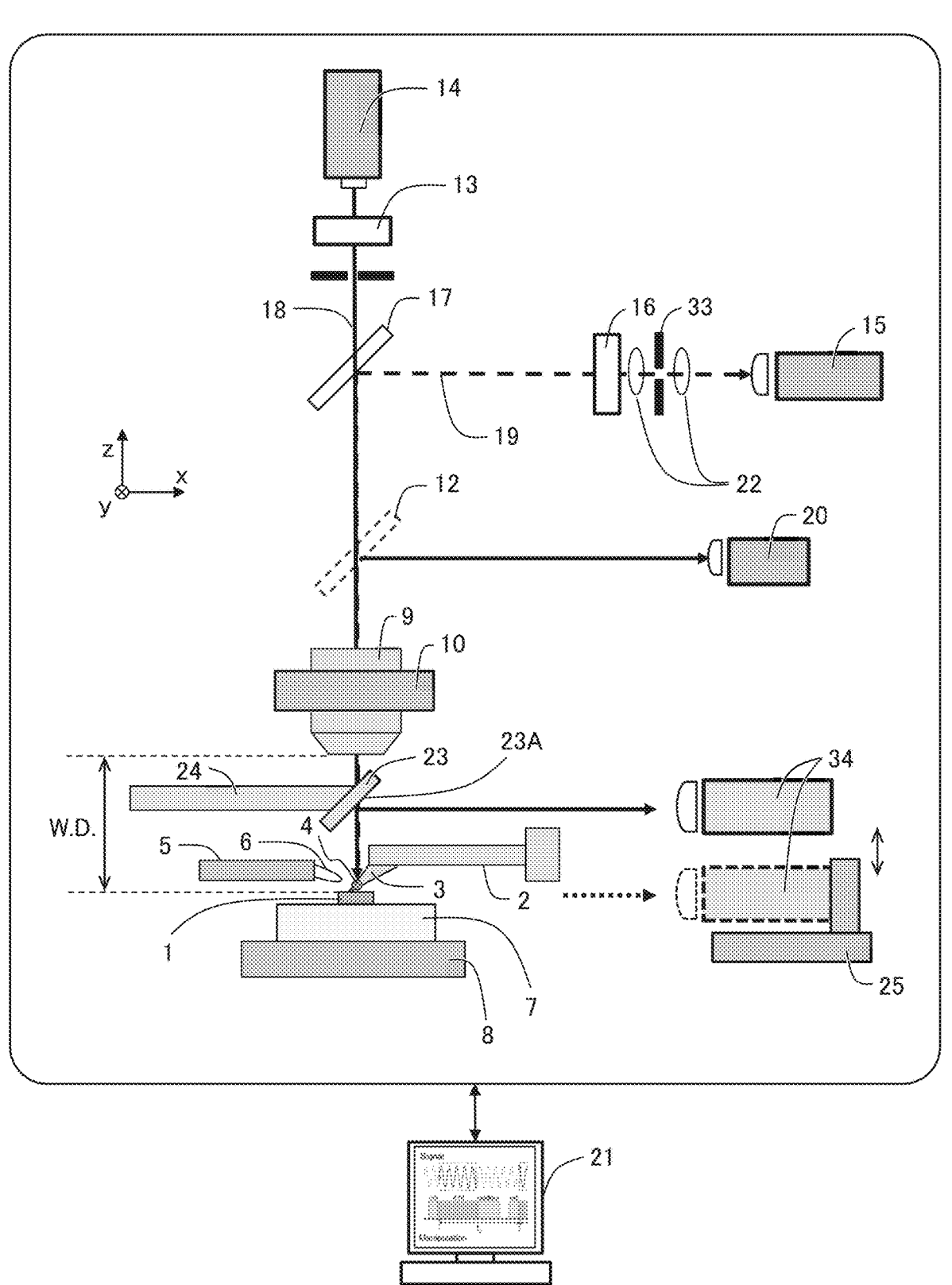
FIG. 1 is a view showing an example of an overall configuration of a scanning probe microscope.

A preferred embodiment of a scanning probe microscope according to the present invention will hereinafter be described with reference to the accompanying drawings. In the following description and the accompanying drawings, constituent elements having the same functional configuration are given the same reference numerals to omit duplicate description.

First Embodiment

FIG. 1 is a view showing an overall configuration of a scanning probe microscope. In FIG. 1, the horizontal direction is assumed to be an x-axis, the direction perpendicular to the paper surface is assumed to be a y-axis, and the vertical direction is assumed to be a z-axis. The scanning probe microscope includes a sample stage 7, a probe 3, a light source 14, an objective lens 9, a detector 15, a microwave antenna 6, a reflective member 23, a reflecting surface imaging device 34, and a computer 21. Each part will be described below.

The sample stage 7 is a device which holds a sample 1 and controls the position of the sample 1 in xyz directions, and is constituted of, for example, a piezo stage. The sample stage 7 is arranged on an anti-vibration table 8.

The probe 3 is a minute needle which scans the sample 1 by moving the sample stage 7 in the xyz directions. The probe 3 has an NV diamond, silicon carbide, or the like including an NV center 4 which is a light emitting point. The probe 3 may be fixed to the tip of a probe driving unit 2 and be controlled in position by the probe driving unit 2.

The light source 14 is a device which irradiates the probe 3 with excitation light 18. The excitation light 18 is, for example, laser light with a wavelength of 532 nm. The timing at which the excitation light 18 is irradiated may be controlled by the operation of an optical switch 13.

The objective lens 9 is a lens which focuses the excitation light 18 onto the NV center 4 included in the probe 3. The excitation light 18 is applied to the NV center 4 along the optical axis of the objective lens 9. The position of the objective lens 9 may be controlled by an objective lens driving unit 10 comprised of, for example, a piezo stage.

The detector 15 is a device which detects fluorescence 19 generated at the NV center 4 of the probe 3. The fluorescence 19 generated at the NV center 4 reaches the detector 15 via the objective lens 9, a wavelength selection mirror 17, a wavelength selection filter 16, lenses 22, and a pinhole 33. By passing through the wavelength selection mirror 17 and the wavelength selection filter 16, only the fluorescence 19 of about 600 nm or more, for example reaches the detector 15. A light emitting region of the NV center 4 is limited to 1 μm or less in the z direction by a confocal optical system comprised of the pinhole 33 with a diameter of about several tens of μm and the lenses 22 arranged before and after the pinhole 33.

The microwave antenna 6 irradiates the probe 3 with microwaves and is arranged within a predetermined distance from the probe 3, for example, within 50 μm. By detecting the fluorescence 19 while changing the wavelength of the microwaves irradiated to the probe 3, for example, an optically detected magnetic resonance (ODMR) spectrum corresponding to Zeeman splitting, which is the basis of magnetic field measurement, can be acquired. The microwave antenna 6 may be fixed to the tip of the antenna driving unit 5 and controlled in position by the antenna driving unit 5.

The reflective member 23 has a reflecting surface 23A which reflects the upper surface of the sample 1 and is arranged between the objective lens 9 and the sample 1. The reflective member 23 is configured to be stored within the working distance (W.D.) of the objective lens 9. For example, when W. D. is 4.5 mm, the tip of a glass tube having a diameter of 2 mm is cut at 45° with respect to the central axis of the glass tube, and a metal film is formed on the cut surface to form the reflective member 23 having the metal film as the reflecting surface 23A. Note that the angle between the cut surface and the central axis is not limited to 45°. Also, the position and attitude of the reflective member 23 may be controlled by a reflective member driving unit 24.

The reflecting surface imaging device 34 is a device which images the reflecting surface 23A of the reflective member 23. Since an image of the upper surface of the sample 1 reflected on the reflecting surface 23A of the reflective member 23 does not pass through the objective lens 9, it has a relatively wide field of view, for example, a field of view of about 2 mm square. Therefore, it is possible to easily determine a measurement location in the sample 1 by using the captured image of reflecting surface 23A.

Further, the position and attitude of the reflecting surface imaging device 34 may be controlled by the imaging device driving unit 25. For example, the reflecting surface imaging device 34 located on the side of the reflective member 23 is moved in the z direction by the imaging device driving unit 25 and positioned on the side of the sample 1, thereby making it possible to obtain an image of the sample 1 captured from the x direction. Since the image of the sample 1 captured from the side is also not acquired through the objective lens 9, it has a relatively wide field of view.

The computer 21 is a device which controls the operation of each unit according to a program and generates and displays various images.

Incidentally, the scanning probe microscope may include: a flip mirror 12 which separates reflected light from the sample 1; and an imaging device 20 which images the separated reflected light. The field of view of the image obtained by the imaging device 20 is relatively narrow, for example, about 200 m square because it passes through the objective lens 9.

Figure 2:
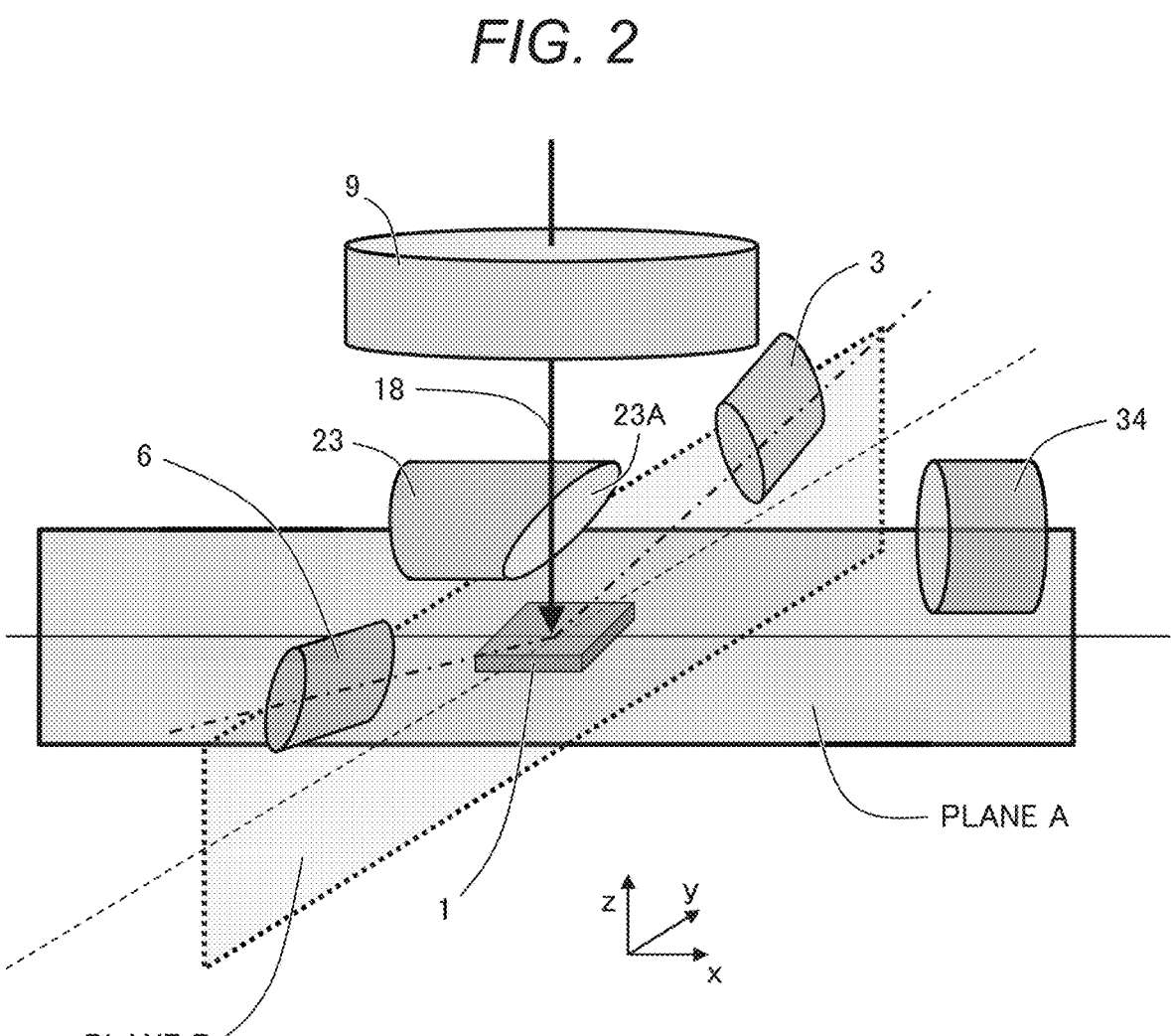
FIG. 2 is a perspective view showing an arrangement example of a reflective member, a reflecting surface imaging device, a probe, and a microwave antenna.

An arrangement example of the reflective member 23, the reflecting surface imaging device 34, the probe 3, and the microwave antenna 6 will be described with reference to FIG. 2. The arrangement of the reflective member 23, the reflecting surface imaging device 34, the probe 3, and the microwave antenna 6 is not limited to the arrangement of the four on the same plane as illustrated in FIG. 1. There is illustrated in FIG. 2 an arrangement in which a plane A including the central axis of the reflective member 23 and the central axis of the reflecting surface imaging device 34 and a plane B including the central axis of the probe 3 and the central axis of the microwave antenna 6 intersect with each other. Incidentally, the angle of intersection between the plane A and the plane B is preferably close to 90°, and is best at 90°. That is, the closer the intersection angle is to 90°, the larger the reflective member 23 can be without causing interference between the pair of the reflective member 23 and the reflecting surface imaging device 34 and the pair of the probe 3 and the microwave antenna 6, thereby making it possible to determine the measurement location in the sample 1 in a wider field of view.

At least one of the planes A and B preferably includes the optical axis of the objective lens 9. It is possible to adjust the measurement location with higher accuracy by including the optical axis in either the plane A or the plane B. Incidentally, when both the plane A and the plane B include the optical axis, the intersection of the plane A and the plane B coincides with the optical axis.

Figure 3:
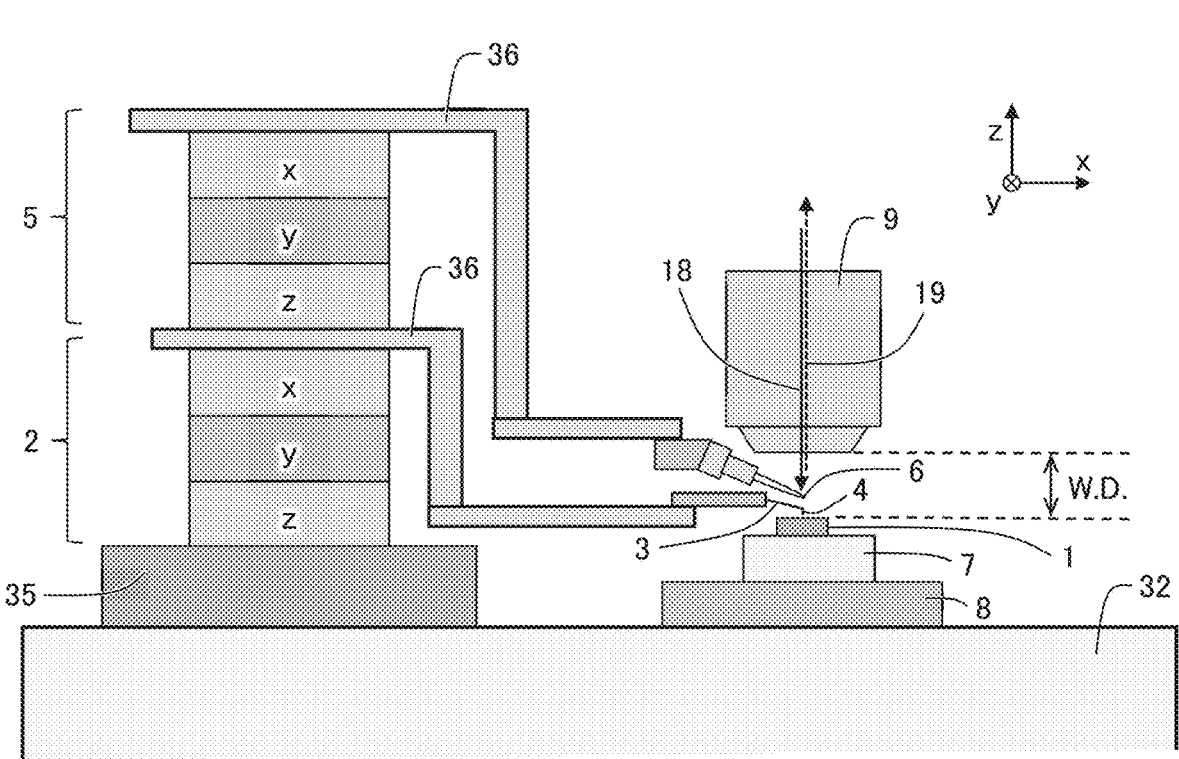
FIG. 3 is a view showing an arrangement example of the probe and the microwave antenna.

An arrangement example of the probe 3 and the microwave antenna 6 will be described with reference to FIG. 3. The arrangement of the probe 3 and the microwave antenna 6 is not limited to one in which both face each other via the optical axis of the objective lens 9 as illustrated in FIGS. 1 and 2. FIG. 3 illustrates an arrangement in which the probe 3 and the microwave antenna 6 are arranged in the z direction. Incidentally, in FIG. 3, the probe 3 and the microwave antenna 6 are connected to the probe driving unit 2 and the antenna driving unit 5 through a support member 36, respectively. Further, the probe driving unit 2 and the antenna driving unit 5 are stacked on a base plate 35 which operates on an optical base plate 32 in the xy directions. With such a structure, the sample 1 can be replaced without readjusting the positions of the probe 3 and the microwave antenna 6. That is, the probe 3 and the microwave antenna 6 adjusted in position by the probe driving unit 2 and the antenna driving unit 5 are adjusted in position relative to the sample 1 by the operation of the base plate 35.

An example of a procedure for adjusting the positions of the probe 3, the microwave antenna 6, and the sample 1 in the scanning probe microscope of FIG. 1 will be described step by step with reference to FIG. 4.

The position of the probe 3 is adjusted. For example, the probe driving unit 2 is controlled by the computer 21 so that the probe 3 is disposed within a predetermined distance from the optical axis of the objective lens 9, based on the fluorescence 19 detected by the detector 15. Incidentally, when the fluorescence 19 is detected by the detector 15, the reflective member 23 is retracted by the reflective member driving unit 24 so as not to overlap the optical axis of the objective lens 9.

The position of the microwave antenna 6 is adjusted. For example, the antenna driving unit 5 is controlled by the computer 21 so that the microwave antenna 6 is disposed within a predetermined distance from the probe 3, based on the image obtained by the reflecting surface imaging device 34. In S402, the reflective member 23 is inserted between the sample 1 and the objective lens 9 by the reflective member driving unit 24.

(S403)

Figure 5A:
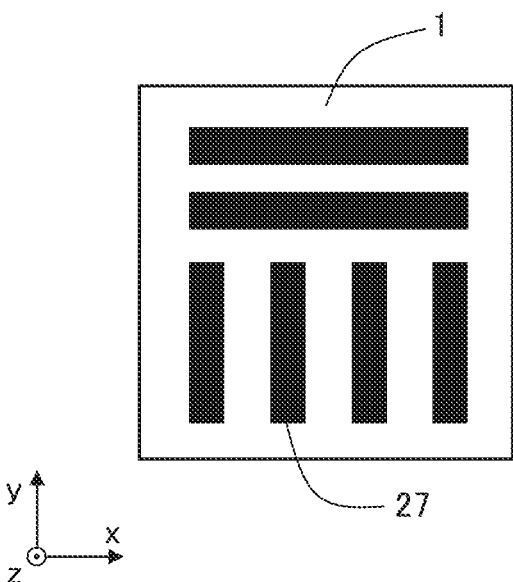
FIG. 5A is a top view showing a structure example of a sample.
Figure 5B:
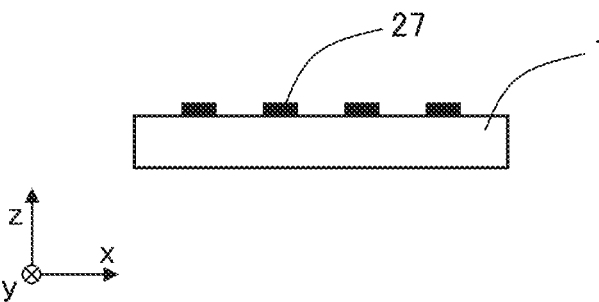
FIG. 5B is a cross-sectional view showing the structure example of the sample.

A coarse adjustment of the position of the sample 1 illustrated in FIGS. 5A and 5B is performed. FIG. 5A is a top view of the sample 1 having sample patterns 27, and FIG. 5B is a cross-sectional view of the sample 1.

Figure 6A:
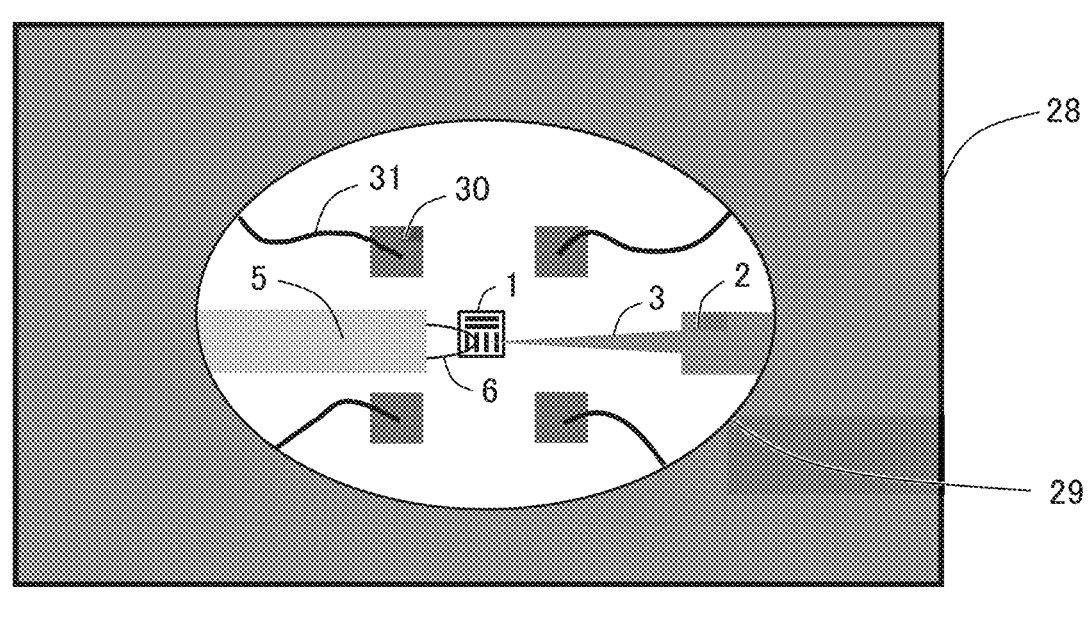
FIG. 6A is a view showing an example of an image of a reflecting surface captured at a low magnification.
Figure 6B:
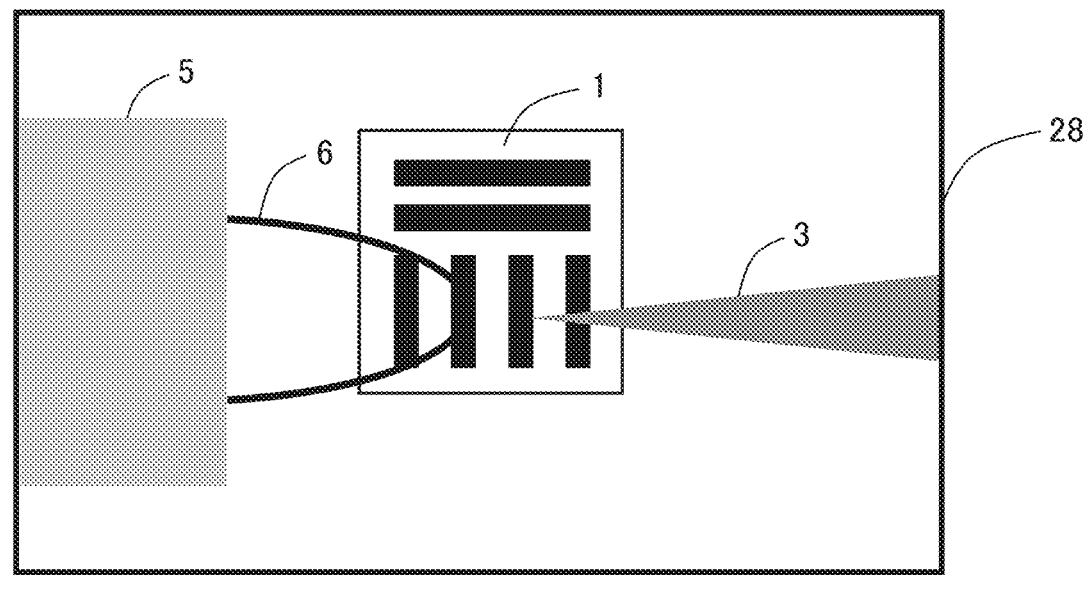
FIG. 6B is a view showing an example of an image of the reflecting surface captured at a high magnification.
Figure 6B:
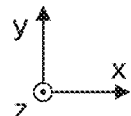

More specifically, based on captured images 28 illustrated in FIGS. 6A and 6B obtained by the reflecting surface imaging device 34, the sample stage 7 is controlled by the computer 21 so that the measurement location of the sample 1 is arranged within the field of view. Incidentally, when the imaging is performed by the reflecting surface imaging device 34, the reflective member 23 is inserted between the sample 1 and the objective lens 9 by the reflective member driving unit 24. FIG. 6A is an image of the reflecting surface 23A of the reflective member 23 captured at a low magnification, and includes a reflecting surface region 29 where the reflecting surface 23A with a diameter of about 2 mm is reflected, and a region other than the reflecting surface region 29. A captured image 28 in FIG. 6A, which is the image captured at the low magnification, represents a power feeding pad 30 and a power feeding line 31 arranged around the sample 1 together with the sample 1, the microwave antenna 6, and the probe 3. The power feeding pad 30 and the power feeding line 31 supply a current to the sample 1 and are used when observing the sample 1 operated by the supply of the current. FIG. 6B is an image of the reflecting surface 23A of the reflective member 23 captured at a high magnification and is an image in which the central portion of FIG. 6A is enlarged. By using an image with a relatively wide field of view like the captured image 28 of FIG. 6A, the time and effort required to determine the measurement location can be reduced. Further, the position of the sample 1 can be adjusted with high accuracy by using a relatively high-magnification image like the captured image 28 in FIG. 6B.

Figure 7A:
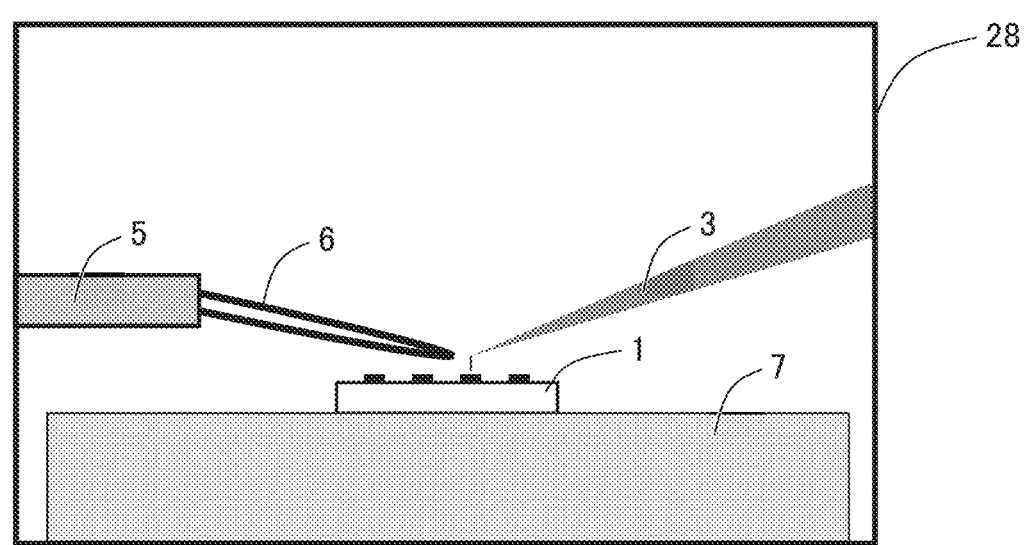
FIG. 7A is a view showing an example of an image of the sample laterally captured at a low magnification.
Figure 7A:
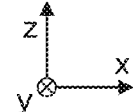
Figure 7B:
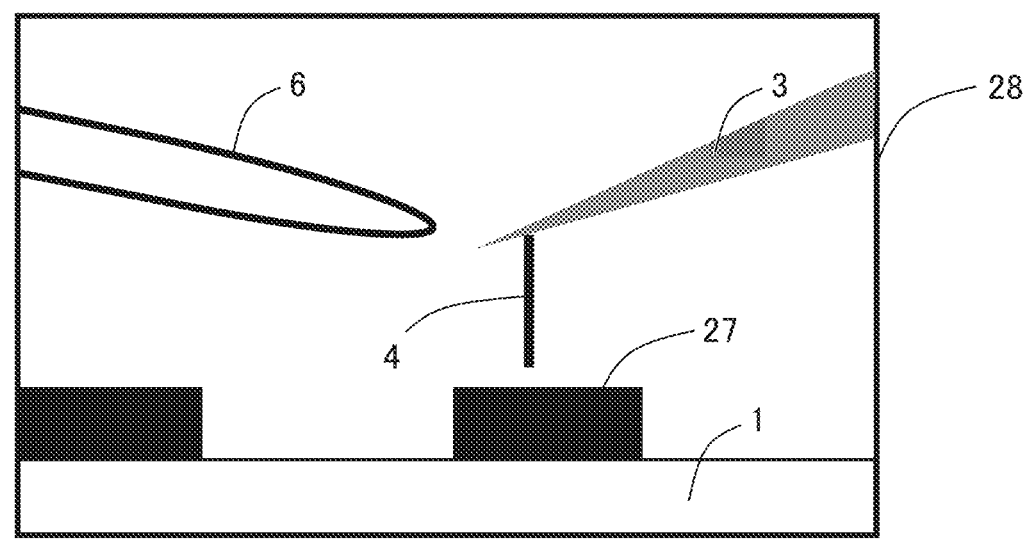
FIG. 7B is a view showing an example of an image of the sample laterally captured at a high magnification.
Figure 7B:
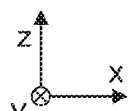

Incidentally, captured images 28 illustrated in FIGS. 7A and 7B may be used for position adjustment of the sample 1 together with the captured images 28 illustrated in FIGS. 6A and 6B. The captured image 28 in FIG. 7A is an image captured from the side of the sample 1 without through the reflective member 23, and is captured after the reflecting surface imaging device 34 is moved parallel to the optical axis of the objective lens 9. The captured image 28 in FIG. 7B is an image captured at a higher magnification than in FIG. 7A. The distance between the probe 3 and the microwave antenna 6 and the sample 1 can be adjusted by utilizing the captured images 28 in FIGS. 7A and 7B. (S404)

A fine adjustment of the position of the sample 1 is performed. For example, the sample stage 7 is controlled by the computer 21 so that the measurement location is arranged at the center of the field of view, based on an image obtained by the imaging device 20 captured with high definition at a high magnification. When the image is obtained by the imaging device 20, the reflective member 23 is retracted by the reflective member driving unit 24 so as not to overlap the optical axis of the objective lens 9. Incidentally, the fine adjustment in S404 may be performed based on the image obtained by the reflecting surface imaging device 34.

The adjustment of the positions of the probe 3, the microwave antenna 6, and the sample 1 is completed by the procedure described with reference to FIG. 4. In particular, in S403, an appropriate measurement location can be easily determined from the sample 1 by utilizing the image of the reflecting surface of the reflective member 23 by the reflecting surface imaging device 34.

Second Embodiment

In the first embodiment, description has been made about the reflective member 23 having the reflecting surface 23A formed on the cut surface by cutting the tip of the glass tube at the inclination angle of 45°. In the second embodiment, description will be made about a reflective member 23 having a through hole 26 along with a reflecting surface

6

23A. Since the configuration other than the reflective member 23 is the same as that in the first embodiment, its description will be omitted.

An example of the reflective member 23 having the through hole 26 will be described with reference to FIG. 8A. The reflective member 23 illustrated in FIG. 8A has a reflecting surface 23A formed on a cut surface having an inclination angle of 45° as in the first embodiment. The through hole 26 through which the optical axis of an objective lens 9 passes is provided in the central portion of the reflecting surface 23A.

Another example of the reflective member 23 having the through hole 26 will be described with reference to FIG. 8B. The reflective member 23 illustrated in FIG. 8B has a reflecting surface 23A formed on the side surface of a triangular prism and has a through hole 26 provided in the central portion of the reflecting surface 23A. The through hole 26 in FIG. 8B is also provided so that the optical axis of an objective lens 9 passes therethrough.

Figure 4:
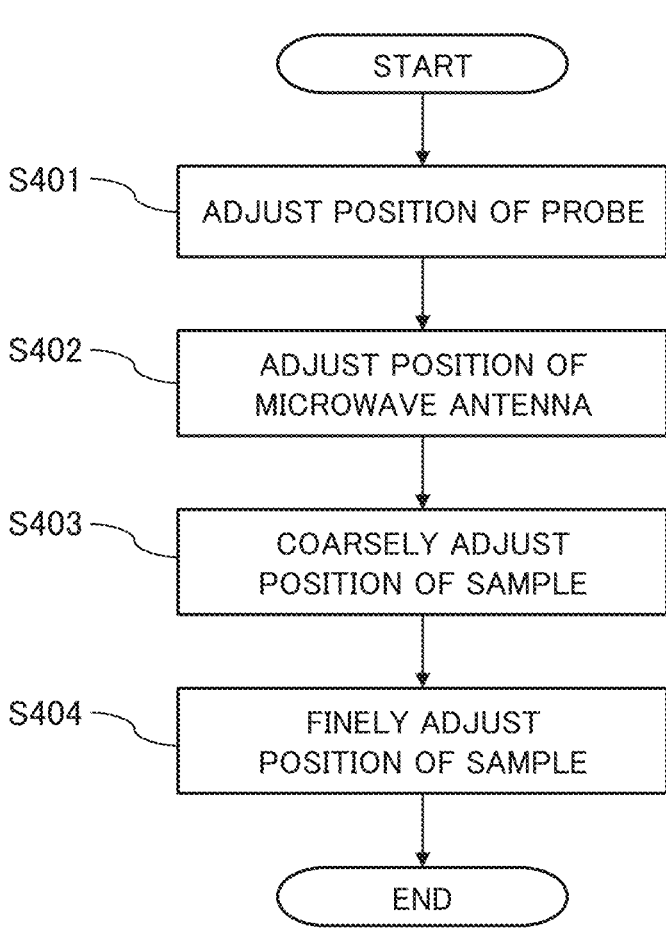
FIG. 4 is a view showing an example of a position adjustment procedure.
Figure 8A:
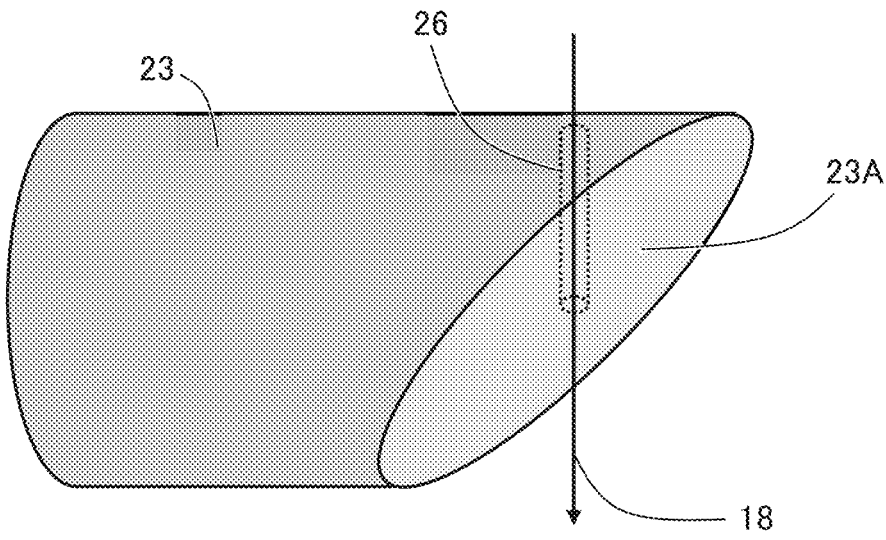
FIG. 8A is a view showing a structure example of the reflective member.
Figure 8B:
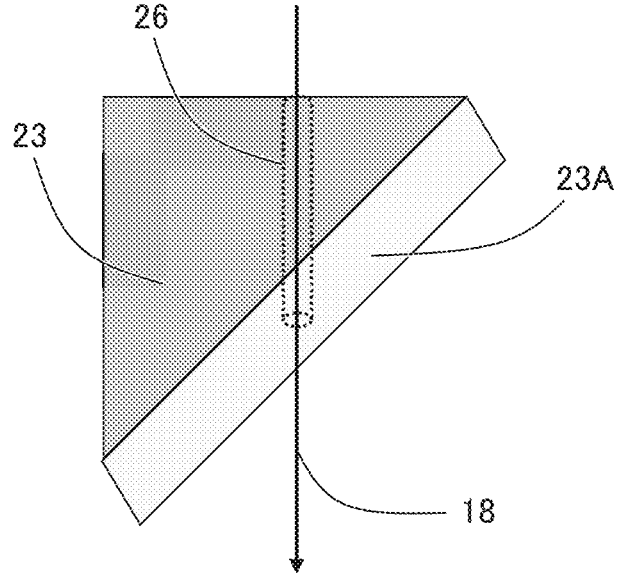
FIG. 8B is a view showing a structure example of a reflective member.

Providing the through holes 26 such as shown in FIGS. 8A and 8B enables detection by the detector 15 and imaging by the imaging device 20, without retracting the reflective member 23 in S401 and S404 of FIG. 4. As a result, the time and effort required to adjust the positions of the probe 3, the microwave antenna 6, and the sample 1 are reduced.

The embodiments of the present invention have been described above. The present invention is not limited to the above embodiments, and can be embodied by modifying the constituent elements within the scope not departing from the gist of the invention. Also, the plurality of constituent elements disclosed in the above embodiments may be combined as appropriate. Further, some constituent elements may be deleted from all the constituent elements shown in the above embodiments.

REFERENCE SIGNS LIST

1: sample
2: probe driving unit
3: probe
4: NV center
5: antenna driving unit
6: microwave antenna
7: sample stage
8: anti-vibration table
9: objective lens
10: objective lens driving unit
12: flip mirror
13: optical switch
14: light source
15: detector
16: wavelength selection filter
17: wavelength selection mirror
18: excitation light
19: fluorescence
20: imaging device
21: computer
22: lens
23: reflective member
23A: reflecting surface
24: reflective member driving unit
25: imaging device driving unit
26: through hole
27: sample pattern
28: captured image
29: reflecting surface region
30: power feeding pad

US 12,650,585 B2

7

31: power feeding line
32: optical base plate
33: pinhole
34: reflecting surface imaging device
35: base plate
36: support member

What is claimed is:

1. A scanning probe microscope, comprising:
a probe which scans a sample;
a light source which irradiates the probe with excitation light via an objective lens; and
a detector which detects fluorescence generated at the probe,
wherein the scanning probe microscope further includes:
a reflective member arranged between the objective lens and the sample; and
a reflecting surface imaging device which images a reflecting surface of the reflective member.

2. The scanning probe microscope according to claim 1, further including a microwave antenna which irradiates the probe with microwaves,
wherein a first plane including a central axis of the probe and a central axis of the microwave antenna and a second plane including a central axis of the reflective member and a central axis of the reflecting surface imaging device intersect with each other.

3. The scanning probe microscope according to claim 2, wherein at least one of the first plane and the second plane includes an optical axis of the objective lens.

4. The scanning probe microscope according to claim 3, wherein an intersection between the first plane and the second plane coincides with the optical axis.

5. The scanning probe microscope according to claim 1, wherein the reflective member has a through hole through which an optical axis of the objective lens passes.

6. The scanning probe microscope according to claim 1, further including an imaging device driving unit which moves the reflecting surface imaging device parallel to an optical axis of the objective lens.

7. The scanning probe microscope according to claim 1, further including:
a microwave antenna which irradiates the probe with microwaves;
an antenna driving unit which controls a position of the microwave antenna; and
a probe driving unit which controls a position of the probe.

8. The scanning probe microscope according to claim 1, wherein the probe has a diamond or silicon carbide having a nitrogen-vacancy pair.

* * * * *